United States Patent
Roth et al.

(10) Patent No.: US 9,445,618 B2
(45) Date of Patent: Sep. 20, 2016

(54) METHOD AND APPARATUS FOR TREATING MEAT PRODUCTS WITH A TREATMENT LIQUID CONTAINING CARBON MONOXIDE

(75) Inventors: Eldon Roth, Dakota Dunes, SD (US); Michael N. Rucks, Vermillion, SD (US); Ryan A. Dial, Elk Pointe, SD (US)

(73) Assignee: Freezing Machines, Inc., Dakota Dunes, SD (US)

(*) Notice: Subject to any disclaimer, the term of this patent is extended or adjusted under 35 U.S.C. 154(b) by 1748 days.

(21) Appl. No.: 11/405,058

(22) Filed: Apr. 17, 2006

(65) Prior Publication Data
US 2006/0286221 A1    Dec. 21, 2006

Related U.S. Application Data

(63) Continuation-in-part of application No. 10/795,000, filed on Mar. 5, 2004, now Pat. No. 7,094,435.

(60) Provisional application No. 60/736,631, filed on Nov. 15, 2005.

(51) Int. Cl.
*A23L 1/27*      (2006.01)
*A23L 1/272*    (2006.01)
(Continued)

(52) U.S. Cl.
CPC .................. *A23L 1/272* (2013.01); *A23B 4/16* (2013.01); *A23B 4/18* (2013.01); *A23B 4/24* (2013.01); *A23B 4/26* (2013.01); *A23L 1/317* (2013.01); *A23L 1/3152* (2013.01); *A23L 1/3255* (2013.01)

(58) Field of Classification Search
CPC ............ A23B 4/24; A23B 4/16; A23B 4/18; A23B 4/20; A23B 4/26; A23L 1/272; A23L 1/3152; A23L 1/317; A23L 1/3255

USPC ......... 426/263, 646, 315, 55, 312, 250, 264, 426/393, 319, 316, 641, 383
See application file for complete search history.

(56) References Cited

U.S. PATENT DOCUMENTS 1,909,508 A * 5/1933 Schick .......................... 426/646
2,145,393 A * 1/1939 Hergert .......................... 426/68
(Continued)

FOREIGN PATENT DOCUMENTS

EP    1 444 899 A1    8/2004
JP    58047429 A      3/1983
(Continued)

OTHER PUBLICATIONS

Communication pursuant to Article 153(7) EPC dated Jan. 22, 2008 (European Application No. 05724391.7-2114)(3 Pages).
(Continued)

*Primary Examiner* — Nikki H Dees
(74) *Attorney, Agent, or Firm* — Russell D. Culbertson; The Culbertson Group, P.C.

(57) ABSTRACT

A treatment material containing carbon monoxide and a carrier liquid is applied to a meat product to produce a desired carbon monoxide content in the meat product. The concentration of carbon monoxide in the added liquid produces a desired carbon monoxide saturation level distributed substantially evenly in the treated area of the meat product. The treated area may be just at the surface of the meat product or throughout the volume of the meat product. Additional treatment liquids or fluids may be added to the meat product as a pre-treatment before application of the carbon monoxide bearing treatment material or as a post-treatment after the application of the carbon monoxide bearing treatment material.

21 Claims, 6 Drawing Sheets

(51) Int. Cl.

| | |
|---|---|
| *A23B 4/16* | (2006.01) |
| *A23B 4/18* | (2006.01) |
| *A23B 4/24* | (2006.01) |
| *A23B 4/26* | (2006.01) |
| *A23L 1/315* | (2006.01) |
| *A23L 1/317* | (2006.01) |
| *A23L 1/325* | (2006.01) |

(56) References Cited

U.S. PATENT DOCUMENTS

| | | | |
|---|---|---|---|
| 2,942,986 A * | 6/1960 | Williams | 426/2 |
| 3,023,109 A | 2/1962 | Hines | |
| 3,119,696 A * | 1/1964 | Williams | 426/55 |
| 3,387,979 A | 6/1968 | Farha | |
| 3,930,040 A | 12/1975 | Woodruff | |
| 4,001,446 A | 1/1977 | Hood | |
| 4,089,983 A * | 5/1978 | Hood | 426/250 |
| 4,211,160 A * | 7/1980 | Bieser | 99/494 |
| 4,220,669 A | 9/1980 | Townsend | |
| 4,292,889 A | 10/1981 | Townsend | |
| 4,522,835 A * | 6/1985 | Woodruff et al. | 426/264 |
| 4,594,253 A * | 6/1986 | Fradin | 426/393 |
| 5,012,728 A | 5/1991 | Langen et al. | |
| 5,059,152 A | 10/1991 | Barber, III | |
| 5,433,142 A | 7/1995 | Roth | |
| 5,489,443 A | 2/1996 | Knipe et al. | |
| 5,507,221 A * | 4/1996 | Lagares-Corominas | 99/532 |
| 5,609,520 A | 3/1997 | Stewart | |
| 5,638,744 A | 6/1997 | Smith | |
| 5,664,488 A | 9/1997 | Smith | |
| 5,773,060 A | 6/1998 | Smith | |
| 5,871,795 A * | 2/1999 | Roth | 426/319 |
| 5,948,123 A | 9/1999 | Hirata et al. | |
| 6,042,859 A | 3/2000 | Shaklai | |
| 6,113,962 A * | 9/2000 | Spencer | 426/316 |
| 6,142,067 A * | 11/2000 | Roth | 99/534 |
| 6,270,829 B1 | 8/2001 | Shaklai | |
| 6,379,728 B1 * | 4/2002 | Roth | 426/231 |
| 6,387,426 B1 * | 5/2002 | Roth | 426/319 |
| 6,389,838 B1 | 5/2002 | Roth | |
| 6,406,728 B1 | 6/2002 | Roth | |
| 6,521,275 B1 | 2/2003 | Mercogliano et al. | |
| 6,564,700 B2 * | 5/2003 | Roth | 99/486 |
| 6,565,904 B2 | 5/2003 | Roth | |
| 6,713,108 B2 | 3/2004 | Roth | |
| 6,899,908 B2 | 5/2005 | Roth | |
| 7,004,065 B2 | 2/2006 | Roth | |
| 7,022,361 B2 | 4/2006 | Roth | |
| 7,094,435 B2 | 8/2006 | Roth | |
| 7,214,398 B2 | 5/2007 | Roth | |
| 7,781,004 B2 | 8/2010 | Roth | |
| 2002/0015777 A1 | 2/2002 | Roth | |
| 2002/0127314 A1 * | 9/2002 | Roth | 426/319 |
| 2002/0150659 A1 * | 10/2002 | Roth | 426/319 |
| 2003/0044497 A1 * | 3/2003 | Kowalski | 426/315 |
| 2004/0241296 A1 | 12/2004 | Roth | |
| 2004/0247769 A1 | 12/2004 | Victoria et al. | |
| 2006/0141109 A1 | 6/2006 | Roth | |
| 2006/0286222 A1 | 12/2006 | Roth | |
| 2006/0292272 A1 | 12/2006 | Roth | |
| 2007/0014901 A1 | 1/2007 | Roth | |
| 2008/0057165 A1 | 3/2008 | Roth | |
| 2008/0124436 A1 | 5/2008 | Roth et al. | |
| 2010/0159087 A1 | 6/2010 | Roth et al. | |

FOREIGN PATENT DOCUMENTS

| | | |
|---|---|---|
| JP | 61-135552 A | 6/1986 |
| JP | SHO6439965 | 2/1989 |
| JP | 03004737 A | 1/1991 |
| SU | 2081186/13 | 12/1976 |

OTHER PUBLICATIONS

International Search Report for PCT/US2006/41405 dated May 8, 2007 (3 Pages).
Written Opinion of the International Search Authority (PCT Rule 43bis. 1) for PCT/US2006/41405 dated May 8, 2007 (3 Pages).
International Search Report (PCT Article 18 and Rules 43 and 44) dated Dec. 1, 2004, (PCT Application No. PCT/US03/39008) (2 pages).
International Search Report (PCT Article 18 and Rules 43 and 44) dated Nov. 12, 2004, (PCT Application No. PCT/US03/32278) (3 pages).
AIPO, Examiner's First Report dated May 12, 2011, in corresponding Australian application No. 2006315883 (4 pages).
NZIPO, Examination Report dated Mar. 29, 2010, in corresponding New Zealand application No. 568022 (2 pages).
NZIPO, Examination Report dated May 10, 2011, in corresponding New Zealand application No. 568022 (2 pages).
USPTO, Office Action Summary dated Mar. 4, 2009, in U.S. Appl. No. 11/510,418 (19 pages).
USPTO, Office Action Summary dated Mar. 5, 2009, in U.S. Appl. No. 11/502,841 (17 pages).
USPTO, Office Action Summary dated Dec. 28, 2009, in U.S. Appl. No. 11/502,841 (13 pages).
USPTO, Office Action Summary dated Aug. 20, 2010, in U.S. Appl. No. 11/502,841 (13 pages).
USPTO, Office Action Summary dated Apr. 7, 2011, in U.S. Appl. No. 11/502,841 (13 pages).
USPTO, Office Action Summary dated Jan. 6, 2010, in U.S. Appl. No. 11/927,496 (14 pages).
USPTO, Office Action Summary dated Sep. 10, 2010, in U.S. Appl. No. 11/927,496 (9 pages).
USPTO, Office Action Summary dated Apr. 28, 2011, in U.S. Appl. No. 11/927,496 (12 pages).
http://www.jtbaker.com/msds/englishhtml/A5916.htm, Ammonium hydroxide, dated Aug. 15, 2004 (9 pages).
http://www.atsdr.cdc.gov/toxprofiles/tp126-c4.pdf, "Ammonia" Chemical and Physical information, dated Oct. 21, 2004, pp. 107-110 (5 pages).
http://www.chemistryexplained.com/Ru-Sp/Solution-Chemistry.html, Solution Chemistry, date retrieved Apr. 18, 2011 (4 pages).
USPTO, Office Action dated Dec. 7, 2011 in U.S. Appl. No. 11/510,357 (23 pages).

* cited by examiner

METHOD AND APPARATUS FOR TREATING MEAT PRODUCTS WITH A TREATMENT LIQUID CONTAINING CARBON MONOXIDE

CROSS-REFERENCE TO RELATED APPLICATIONS

This application is a continuation-in-part of U.S. patent application Ser. No. 10/795,000, filed Mar. 5, 2004 now U.S. Pat. No. 7,094,435, and entitled "Method and Apparatus for Treating Meat Products With Carbon Monoxide." The benefit of this prior application is hereby claimed in the present application pursuant to 35 U.S.C. §120. This application also claims the benefit under 35 U.S.C. §119(e) of U.S. Provisional Patent Application Ser. No. 60/736,631, filed Nov. 15, 2005, and entitled "Method and Apparatus for Treating Meat Products With a Treatment Liquid Containing Carbon Monoxide." The entire content of each of these prior applications is incorporated herein by this reference.

TECHNICAL FIELD OF THE INVENTION

This invention relates to meat processing operations and equipment. More particularly, the invention relates to methods and apparatus for treating meat products with carbon monoxide by injection and/or surface treatment.

BACKGROUND OF THE INVENTION

It has long been known that meat may be treated with carbon monoxide to maintain a color in the meat product. In particular, carbon monoxide treatment may produce a bright red color in the meat product. U.S. Pat. No. 4,522,834 to Woodruff et al. discloses a process of treating meat products with carbon monoxide gas to modify the color at the surface of the meat product.

It has also been proposed to use carbon monoxide gas as a preservative in meat products. U.S. Pat. No. 6,270,829 to Shaklai discloses a process where raw meat is exposed to carbon monoxide gas for a sufficient period to saturate the meat with carbon monoxide to inhibit microbial activity in the meat product. The Shaklai patent also discloses that the carbon monoxide saturation in the meat product produces a color change throughout the meat product.

Carbon monoxide gas has also been used in an injection material to treat meat products. U.S. Pat. No. 3,119,696 to Williams discloses injecting meat with a water and gas combination for the purpose of improving the tenderness of the meat. The Williams patent discloses that the gas is included in the water/gas treatment material to help facilitate absorption of the water fraction into the meat. The Williams patent also discloses that carbon monoxide may be included in the gas portion of the water/gas combination in order to modify the color of the meat in the interior of the meat product.

The change in color from carbon monoxide treatment results from the reaction of carbon monoxide with hemoglobin and myoglobin in meat products to form carboxyhemoglobin and carboxymyoglobin respectively. The microbial activity inhibiting effect of carbon monoxide in meat products is at least in part produced by reducing the oxygen content in the meat product. This reduction in oxygen content creates an unsuitable environment for aerobic microbes. Carbon monoxide treatment may also inhibit the growth and propagation of anaerobic microbes as well.

Despite the benefits, there remain certain problems associated with treating meat products with carbon monoxide. One problem with treating uncooked meats with carbon monoxide is that the treatment may affect the color of the product after the meat begins to spoil and after cooking as well as before. In particular, prior art carbon monoxide treatments may leave the uncooked meat with a bright red color that remains in the meat even after it is cooked. This unnatural red color in the cooked meat product occurs throughout the product where the entire product is saturated with carbon monoxide. Even where only the surface of the meat product is saturated with carbon monoxide, the surface of the cooked meat product may have an unnatural red color and the meat may not brown properly. Thus, although the carbon monoxide treated, uncooked meat product may have an appearance that is desirable to consumers, the color in the uncooked meat product may mask spoilage and the color remaining in the cooked meat product may be unacceptable to consumers.

SUMMARY OF THE INVENTION

The present invention provides a method for treating meat products with carbon monoxide to obtain especially the microbe inhibiting benefits associated with carbon monoxide treatment while reducing or eliminating the problems associated with unnatural color in the uncooked and cooked meat product. The invention also encompasses apparatus for treating meat products with carbon monoxide. It is noted that the term "meat product" is used here and throughout this disclosure and the accompanying claims to refer to meat alone, including lean portions, fat, and related materials of beef, pork, poultry, or seafood, and to refer to meat that has been mixed with, or includes, additives such as flavorings, extenders, tenderizing agents, and other materials.

The present invention utilizes a treatment material containing carbon monoxide and a carrier liquid. This treatment material containing carbon monoxide and a carrier liquid will be referred to in this disclosure as a "CO treatment material" for purposes of convenience. According to the invention, a CO treatment material is applied to a meat product to produce a desired carbon monoxide saturation or content at various locations in the meat product. The amount of carbon monoxide in the CO treatment material is controlled to produce a desired carbon monoxide saturation level in the various treated areas of the meat product. The treated area of the meat product may be just at the surface of the meat product, in the interior of the meat product, or both at the surface and interior of the meat product. The desired saturation level may vary depending upon the nature of the meat product being treated, however, the saturation level will generally remain at less than 100% or complete saturation for most meat products. Also, the CO treatment material may be controlled to provide different carbon monoxide saturation levels at different locations of the meat product. Additional treatment liquids or fluids may be added to the meat product as a pre-treatment before application of CO treatment material and/or as a post-treatment after the application of CO treatment material. The carrier liquid in the CO treatment material helps to dilute or buffer the effect of the carbon monoxide in the meat product and helps facilitate the desired carbon monoxide saturation in the meat product without producing adverse color effects in the meat product.

As used in this disclosure and the accompanying claims, complete or 100% carbon monoxide saturation in a meat product refers the case where all of the available hemoglobin and myoglobin in the meat product has been reacted with carbon monoxide to produce carboxyhemoglobin and carboxymyoglobin respectively. It will be noted that this does not necessarily mean that all hemoglobin and all myoglobin has been reacted since some hemoglobin and myoglobin in a meat product may reside in a state in which the reaction with carbon monoxide may not occur and may thus not be available to react with the carbon monoxide. Carbon monoxide saturation levels less than complete saturation may be described in this disclosure and the following claims as a percentage relative to complete saturation. For example, as used in this disclosure and the accompanying claims, 50% carbon monoxide saturation means that one-half of the available hemoglobin and myoglobin in the meat product has been converted to carboxyhemoglobin and carboxymyoglobin, respectively.

In one preferred form of the present invention, the carrier liquid comprises water, and the CO treatment material is applied to the surface of a meat product such as a steak or roast. The application of the CO treatment material at the surface of the meat product may be accompanied by the injection of the same type of CO treatment material or a different type of CO treatment material into an interior volume of the meat product. The surface treatment with carbon monoxide and carrier liquid may precede the injection treatment, follow the injection treatment, or be performed simultaneously with the injection treatment. A treatment material that is applied to the surface of the meat product will be referred to in this disclosure as a surface treatment material, whereas a treatment material that is injected into the interior volume of meat product will be referred to as an interior treatment material. Application of a surface treatment material may also be accompanied by the injection into the interior of the meat product of a treatment material that does not include carbon monoxide.

It will be appreciated that the application of a CO treatment material to the surface of a meat product will generally produce an effect in the meat product below the surface of the meat product. That is, the CO treatment material applied to the surface of the meat product may either be absorbed into the meat from the surface or may be carried beneath the surface by the force at which the CO treatment material is sprayed on or otherwise applied to the surface of the meat product. The treatment by applying the CO treatment material to the surface of the meat product is referred to as a "surface treatment" in this disclosure and accompanying claims even though the surface treatment affects the meat product below the surface of the meat product.

Where a CO treatment material is injected into the interior of a meat product according to the invention, the CO treatment material may be injected through one or more injection conduits that are inserted into the meat product being treated. Meat products comprising relatively large cuts of meat may require a number of injection conduits inserted at spaced apart locations throughout the volume of the meat product to evenly distribute the CO treatment material. Otherwise, a single injection conduit or relatively few injection conduits may be moved to various locations throughout in the meat product to inject the CO treatment material so as to produce the desired carbon monoxide distribution.

Post-treatment according to the invention may include the application of a vacuum to draw off excess carbon monoxide from the meat product, both from the surface of the meat product and from the interior volume of the meat product. Alternatively or in addition to applying a vacuum, a flushing or rinsing fluid may be applied to the surface of the carbon monoxide treated meat product to remove excess carbon monoxide. This flushing or rinsing may remove excess carbon monoxide from the surface of the meat product and may also help remove unbound carbon monoxide from the interior of the meat product. After carbon monoxide treatment and any post-treatment, the treated meat product may be packaged or stored in a carbon dioxide atmosphere or other suitable atmosphere, or in a package having substantially no atmosphere.

Some forms of the invention may include treating the meat product with a pH modifying material, especially an ammonia-based pH modifying material such as ammonium hydroxide solution or ammonia gas. Forms of the invention that include injecting a pH modifying material may inject the pH modifying material as a pre-treatment fluid, post-treatment fluid or in a treatment material with the carbon monoxide. Forms of the invention that include applying a CO treatment material to a surface of a meat product may include a pH modifying material in the surface CO treatment material. Also, different pH modifying materials may be used at different points in the treatment process to either raise the pH or lower the pH of the meat product. Carbon monoxide treatment according to the invention is particularly beneficial when combined with pH modifying treatments because it believed that the carbon monoxide affects the manner in which pH modifying materials are absorbed into the meat products. In particular, it is believed that the carboxy forms of hemoglobin and myoglobin formed from carbon monoxide treatment do not allow certain constituents in the pH modifying material to be absorbed with the hemoglobin and myoglobin. These constituents of the pH modifying material are beneficially absorbed elsewhere in the meat product. It is also believed that when pH modifying material is used together with carbon monoxide, the pH modifying material may help reduce the effect of the carbon monoxide on the color of the meat product and/or help make the color change less permanent. Thus, carbon monoxide treatments according to the present invention may produce the desired microbe inhibiting effect without unduly maintaining the red color in the treated product which might mask spoilage or affect the appearance of the cooked product.

These and other advantages and features of the invention will be apparent from the following description of the preferred embodiments, considered along with the accompanying drawings.

DESCRIPTION OF PREFERRED EMBODIMENTS

Figure 1:
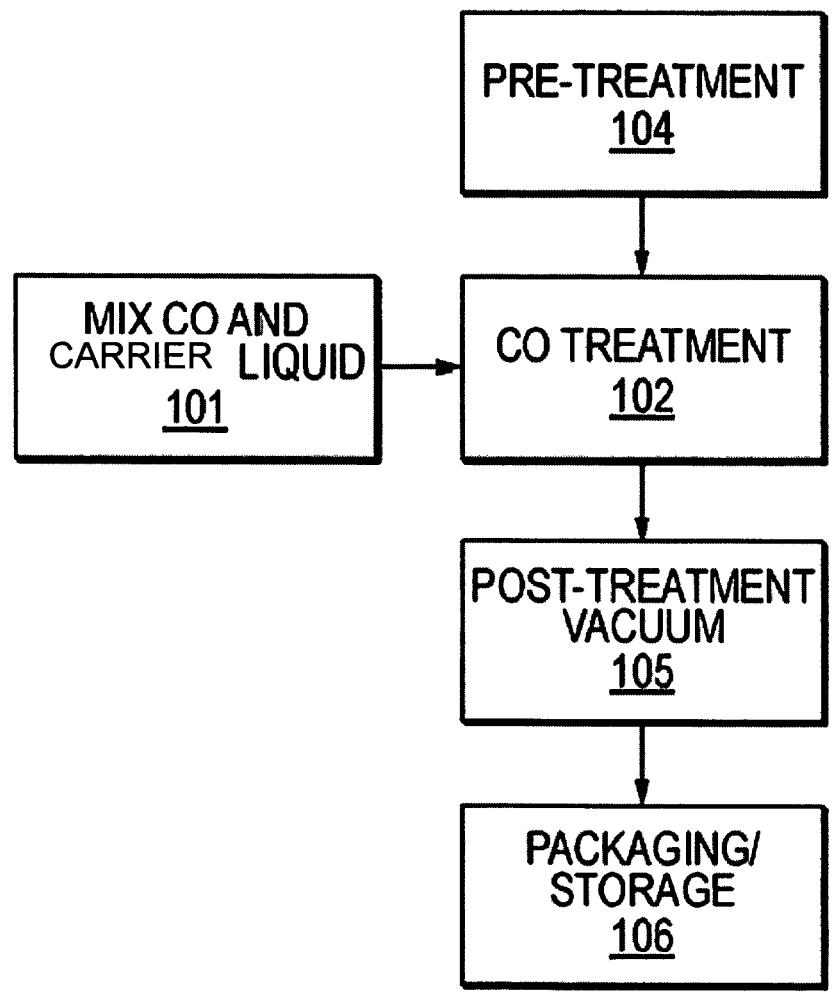
FIG. 1 is a block diagram illustrating the steps in one preferred treatment method embodying the principles of the present invention.

FIG. 1 will be used to describe various treatment methods within the scope of the invention. FIGS. 2 through 7 will be used to describe apparatus that may be used to treat meat products according to the invention and further variations on the treatment methods shown in FIG. 1.

Referring to FIG. 1, a basic treatment process embodying the principles of the present invention includes mixing carbon monoxide and a carrier liquid as shown at block 101 in FIG. 1, to produce a CO treatment material, that is, a treatment material containing carbon monoxide and a carrier liquid. The process then includes injecting the CO treatment material into the volume of a meat product and/or applying the CO treatment material to the surface of the meat product. This carbon monoxide treatment step is shown at process block 102 in FIG. 1. The manner in which the CO treatment material may be injected will be described below with reference to the apparatus shown in FIGS. 2 and 3. Surface treatment with the CO treatment material will be described below with reference to FIGS. 6 and 7.

The carbon monoxide in the CO treatment material formed at block 101 in FIG. 1 is preferably held primarily in solution in the carrier liquid both as the CO treatment material is applied to the meat product and immediately after it is applied. Thus, the content of carbon monoxide in the carrier liquid is preferably at or below the solubility level of carbon monoxide in the carrier liquid at the temperature of the carrier liquid at atmospheric pressure. For example, the solubility of carbon monoxide in water at 32 degrees Fahrenheit and one atmosphere is approximately 4.398 mg/100 ml of water. Therefore, the carbon monoxide content in a carrier liquid comprising water at 32 degrees Fahrenheit is preferably no greater than 4.398 mg/100 ml of carrier liquid. It should be noted that the presence of other materials dissolved in the carrier liquid may affect the amount of carbon monoxide that may be held in solution in the carrier liquid. Thus, the preferred maximum carbon monoxide content in the carrier liquid may vary depending upon the other materials to be held in solution in the carrier liquid.

Although some preferred forms of the invention utilize a CO treatment material in which substantially all of the carbon monoxide is held in solution in the carrier liquid, some carbon monoxide in the CO treatment material may also be in the form of a gas suspended in the carrier liquid or as a gas atomizing/vaporizing the carrier liquid. However, the total carbon monoxide content in the CO treatment material should be low enough to avoid 100% carbon monoxide saturation in the treated meat product.

The desired carbon monoxide saturation level in the treated meat product may vary with the nature of the meat product being treated. In some meat products, such as those that have or will have added seasonings, carbon monoxide saturation may approach 100% saturation. In lightly seasoned or unseasoned meat products, such as steaks for example, the desired carbon monoxide saturation according to the invention remains below 100% saturation, and preferably at approximately 95%. Carbon monoxide saturation levels at approximately 70%, 60%, 50%, and 40% or lower may also be used according to the invention. It should also be noted that the desired carbon monoxide saturation level in the treated meat product may vary with the amount of liquid added to the meat product. For example, a meat product treated according to the invention with added liquid content at 20% by weight with the meat may allow a higher desired carbon monoxide saturation level than at added liquid content at 5% by weight with the meat. In any event, the carbon monoxide saturation level in the meat product treated according to the present invention should include a carbon monoxide saturation level or content low enough for the particular product to allow the meat product to brown properly in the course of cooking. The carbon monoxide saturation in the meat product should also be low enough to allow the meat product to display characteristics associated with the growth of spoilage bacteria in the meat product so that the color effect occasioned by carbon monoxide treatment does not mask spoilage in the meat product.

Carbon monoxide saturation in the meat product may also vary by location in the meat product. When meat products such as steaks are cooked, there will commonly be a high temperature zone that may extend approximately one-sixteenth to approximately one-eighth of an inch into the meat product from the surface of the meat product. The high temperature zone will be exposed to relatively high temperatures during cooking, between 200 degrees Fahrenheit and 250 degrees Fahrenheit, for beef steaks for example. The carbon monoxide saturation level in these high temperature zones of a meat product may be higher than elsewhere in the meat product and not interfere with browning in the high temperature zones of the meat product during cooking. However, the center portions of the meat product further inward from the high temperature zone will commonly be exposed to lower temperatures during cooking. For example, beef is considered well done at an internal temperature of 170 degrees Fahrenheit, and thus the temperature at the center of a well done beef steak will reach approximately 170 degrees Fahrenheit. Due to the lower cooking temperature in the center portion of the meat product beyond the high temperature zone, the center portion of the meat product may require a lower carbon monoxide saturation as compared to the saturation in high temperature zones in order to avoid undesirable red coloring in the center portions of the cooked meat. pH enhancement in the interior of the meat product prior to a surface carbon monoxide treatment according to the present invention may help produce a lower carbon monoxide saturation in the center portions of the meat product as compared to the high temperature zones near the surface of the meat product. Also, different CO treatment materials may be used to produce the desired carbon monoxide saturation level in the center portions of the meat product and relatively higher carbon monoxide saturation in the high temperature zones of the meat product. For example, a CO treatment material for use in a surface treatment may contain a higher concentration of carbon monoxide than a CO treatment material for use in injection into the interior of the meat product.

Thin meat products such as one-half inch thick beef steaks for example, may be exposed to relatively lower temperatures in the high temperature zones in order to reach the desired doneness in the center of the steak. Thus, these thin meat products may require lower carbon monoxide saturation levels in the high temperature zones (as compared to saturation levels in the high temperature zones of relatively thicker steaks) in order to avoid undesirable red coloring in the cooked meat. Also, it may be preferably to apply a CO treatment material as a surface treatment material for steaks and other meat products less than about one inch thick. The CO treatment material may also be applied to the surface of a one-inch thick meat product to provide a surface penetration of less than one-quarter (¼) inch for the CO treatment material, or even less for thinner meat products.

Where steaks and other large cuts of meat have been treated with a CO treatment material to produce a relatively high CO saturation in a surface layer of the meat product, the interior areas of the meat product beyond the surface layer have been found to take on a brown or purple "reduced" appearance while the surface layer remains a desirable bright red. Over time, the brown or purple color in the interior of the meat product may bleed through the red surface layer in the meat product and become apparent on the surface of the meat product. At this point, the brown/purple color at the surface of the meat product may be undesirable to consumers and thus unsaleable. However, the thickness of the red surface layer in the meat product may be controlled so that the bleed-through of color from the center of the meat product occurs just before the growth of spoilage bacteria in the meat product makes the product unwholesome and unsuitable for sale or consumption. Thus, the thickness of the red surface layer in CO treated meat products according to the invention may be controlled so as to function as a marker to indicate that the product is too old to sell.

The step of mixing carbon monoxide with carrier liquid shown at block 101 in FIG. 1 may be accomplished in any suitable fashion for producing the desired CO treatment material. For example, carbon monoxide gas may be sparged into a carrier liquid such as water using a suitable sparging device. A sparging device will be described with reference to FIG. 4 below. Alternatively, one or more positive displacement devices may be used to produce the desired proportion of carbon monoxide and carrier liquid in a CO treatment material according to the present invention. An arrangement of positive displacement devices will be described below with reference to FIG. 5. It should also be noted that although it is preferable to mix the carbon monoxide and carrier liquid at a location near the equipment that will be used to inject and/or apply the treatment material to the meat product, the mixing step shown at block 101 in FIG. 1 may be performed at a location far removed from the injection/application equipment, and the injection/application may be performed well after the carbon monoxide/carrier liquid mixing step. Where the carrier liquid comprises water with other materials such as salts or pH modifying materials in solution, some preferred forms of the invention include mixing the carbon monoxide with the water first and then adding the other materials to the carbon monoxide-treated water. Other preferred forms of the invention add pH modifying materials such as ammonia to the carrier liquid prior to adding carbon monoxide.

The process shown in FIG. 1 indicates that the present treatment method may include a pre-treatment step as shown at process block 104. It will be appreciated that no pre-treatment is required according to the invention. However, a pre-treatment step may be used to inject liquids such as water alone, brines, and/or pH modifying materials into the meat product to prepare the meat product for carbon monoxide treatment. In particular, injecting fluids in a pre-treatment step may reduce the amount of liquid that may be needed when injecting the carbon monoxide as shown at block 102. That is, part of the diluting liquid required to produce the desired carbon monoxide content in the meat product may be injected instead as a pretreatment as shown at process block 104. This injection of pre-treatment liquid may open channels or fluid passages in the meat product that may help facilitate the distribution of carbon monoxide that is injected into the meat product in the treatment step shown at process block 102.

FIG. 1 also shows a post-treatment step at process block 105. As with the pre-treatment step, the post-treatment step shown at process block 105 is not required in embodiments of the present invention. However, a post-treatment step may be used to inject additional liquids into the meat product including water, brines, or pH modifying materials. The liquids injected in any post-treatment step at process block 105 may further help dilute and distribute carbon monoxide in the meat product to help produce the desired carbon monoxide distribution. Process block 105 also indicates that a vacuum may be applied as part of a post-treatment step. A vacuum may be applied to the carbon monoxide treated meat product to draw off excess carbon monoxide from the surface of the meat product and from the interior of the meat product and thereby prevent over-treatment in the meat product. Over-treatment in the sense means any carbon monoxide saturation over the desired saturation level. In addition to or in lieu of applying a vacuum, a flushing liquid or gas may be directed over the surfaces of the carbon monoxide treated meat product to remove excess carbon monoxide from the surface and interior of the meat product and reduce the risk of over-treatment with carbon monoxide which might produce undesirable color effects in the meat product.

Although water is a preferred carrier liquid for use in forming a CO treatment material according to the invention, the invention is not limited to any particular liquid for use as a carrier liquid to mix with carbon monoxide to produce the CO treatment material, and is also not limited to any particular liquid injected in a pre-treatment step at block 104 or a post-treatment step at block 105. Also, pre-treatment and/or post-treatment may include the injection of one or more gases either alone or with a material in a liquid phase. The CO treatment material used in the treatment at block 102 in FIG. 1 may also include one or more gasses. Where pH modifying materials are injected in the pre-treatment and/or post-treatment step, or included in the CO treatment material, the preferred pH increasing materials are ammonia-based materials such as ammonium hydroxide solution or ammonia gas. Preferred pH decreasing materials include carbonic acid solution or carbon dioxide gas. The resulting pH in the carbon monoxide treated product according to the present invention may range from 5.6 to 8.0 or higher. Good results have been produced where the carbon monoxide/pH treated meat product had a final pH of 6.5 to 6.7 as well as where the treated product had a pH of 7.4. The pH of an added liquid used to increase the pH of the meat product (such as an ammonium hydroxide solution) may range from 8.5 to 11.6 or more. It should also be noted that the desired pH of a pH increasing liquid may vary with the level of liquid added to the meat product according to the invention. For relatively low amounts of added liquid such as approximately 5% by weight with the meat, a pH of 11.6 or more in a pH increasing liquid comprising ammonium hydroxide, for example, may be more appropriate. For higher added liquid content, say 15% to 20% for example, a pH of 8.5 or less in the pH increasing liquid such as ammonium hydroxide solution may be more appropriate.

The treated meat product may be packaged as indicated at process block 106 in FIG. 1. Meat products treated with carbon monoxide according to the invention may be packaged in any type of packaging. In some preferred forms of the invention, the carbon monoxide treated meat product is packaged in controlled-atmosphere tray packages under a suitable atmosphere. In particular, a carbon dioxide gas atmosphere is suitable for use in controlled atmosphere packaging for carbon monoxide treated meat products according to the present invention. Other suitable atmospheres include inert gas atmospheres or mixtures of gases such as inert gases and carbon dioxide. Rather than packaging the carbon monoxide treated meat products in controlled atmosphere packages such as tray packages, the treated meat product may be stored in a suitable device under any suitable atmosphere, or may be packaged in a container without an atmosphere such as a vacuum package.

In one particular form of the invention, a pre-treatment step such as that shown at process block 104 in FIG. 1 and/or a post-treatment step such as that shown at process block 105 includes injecting into the volume of a meat product a liquid such as water or ammonium hydroxide solution or other liquid with no carbon monoxide content. In this form of the invention, carbon monoxide may generally be injected at a higher concentration after the pre-treatment liquid injection or before the post-treatment liquid injection, or between pre and post treatment injections. Also, carbon monoxide may be injected in the form of a gas or a gas mixed with other gases. The gases in a mixture with carbon monoxide may help the carbon monoxide to distribute better in the volume of the meat product. Although any suitable carbon monoxide concentration may be used, carbon monoxide concentration in preferred injection gas mixtures may be as low as one-tenth of a percent (0.1%). Carbon monoxide in gaseous form is applied to portions of a meat product preferably only after those portions of the meat product have been exposed to a pH modifying material such as ammonia gas or ammonium hydroxide solution.

Where carbon monoxide is injected in a gas mixture, one preferred gas mixture includes oxygen in a suitable concentration. Oxygen may also be included with liquid treatment fluids in the form of suspended or dissolved oxygen gas or in the form of some other oxygenating material. Oxygen gas, dissolved oxygen, and any oxygenating material may each be referred to in this disclosure and the accompanying claims as an "oxygenating agent." It is believed that the materials added to the meat product such as a pH modifying material (ammonium hydroxide solution for example) interferes with the carbon monoxide binding with hemoglobin and myoglobin in the meat product so that the oxygen may compete better with the carbon monoxide to bind with these materials. Oxygen may be used in the present carbon monoxide treatment process to tie up hemoglobin and myoglobin in the meat thereby reducing the amount of hemoglobin and myoglobin available to react with carbon monoxide to produce the carboxy forms of the materials. Making some of the hemoglobin and myoglobin unavailable for the carbon monoxide may effectively increase the carbon monoxide saturation in a meat product that already includes some carbon monoxide saturation or decrease the amount of carbon monoxide needed to produce a desired saturation level. It is believed that using oxygen and/or other added materials such as pH modifying materials according to the invention to interfere with the binding of carbon monoxide with hemoglobin and myoglobin in the meat product allows the present carbon monoxide treated meat product to better show spoilage in the uncooked product and to produce a more natural appearance upon cooking.

One particular preferred form of treating meat products according to the invention includes injecting a treatment material made up of a compressed gas such as air, carbon monoxide gas, and pH modifying liquid (such as an ammonium hydroxide solution in water). This treatment material may be injected without any pre-treatment or post-treatment to provide the desired carbon monoxide saturation in the meat product without producing an unnatural color in the uncooked meat. The meat product treated in this fashion also browns substantially in the same way that an untreated meat product would brown during cooking.

A test was conducted using a treatment material made up of carbon monoxide gas and compressed and filtered air sparged into a liquid made up of an ammonium hydroxide solution having a pH of approximately 11.0. This treatment material was made up by pumping the ammonium hydroxide solution at approximately three (3) bar and injecting into this solution the compressed air and carbon monoxide. The compressed air was injected into the solution at approximately sixty-five (65) psi through a one-eighth (⅛) inch diameter and approximately one-half (½) inch long orifice. The compressed carbon monoxide gas was injected into the solution at approximately fifty-five (55) psi through four one-half inch long by 0.032 inch diameter orifices connected in series. In this test, the resulting CO treatment material was injected through an injection apparatus including forty (40) injection needles, each with four 0.6 millimeter diameter injection openings. The injection was performed both on the downstroke of the needles into the meat product and on the upstroke. The meat product in the test was at approximately thirty-five (35) degrees Fahrenheit during treatment mixture injection and the injected treatment mixture was at approximately twenty-eight (28) degrees Fahrenheit. The injection resulted in a treated meat product having a weight 15% to 17% higher than the product before injection. The meat product treated in this test, a New York strip cut into steaks, developed a good red color within an hour of treatment and browned normally on cooking. The treated product exhibited essentially none of the tiger striping commonly associated with injected meats, and the cooked product had excellent flavor.

Some preferred forms of the invention may perform the pre-treatment and/or post-treatment steps in rapid succession with the carbon monoxide treatment step shown at block 102 in FIG. 1. Other preferred forms of the invention, however, may include a delay between a pre-treatment and the carbon monoxide application and/or between the carbon monoxide application and any post-treatment. The delay may be from one second to one hundred and twenty (120) seconds or more. It will be appreciated that a delay between treatment steps according to the invention may be sufficiently long to require the meat product to be moved out of an injection station (described below with reference to FIG. 3) to a holding area for at least a portion of the delay period, before proceeding on to the injection station for the next injection step.

Figure 2:
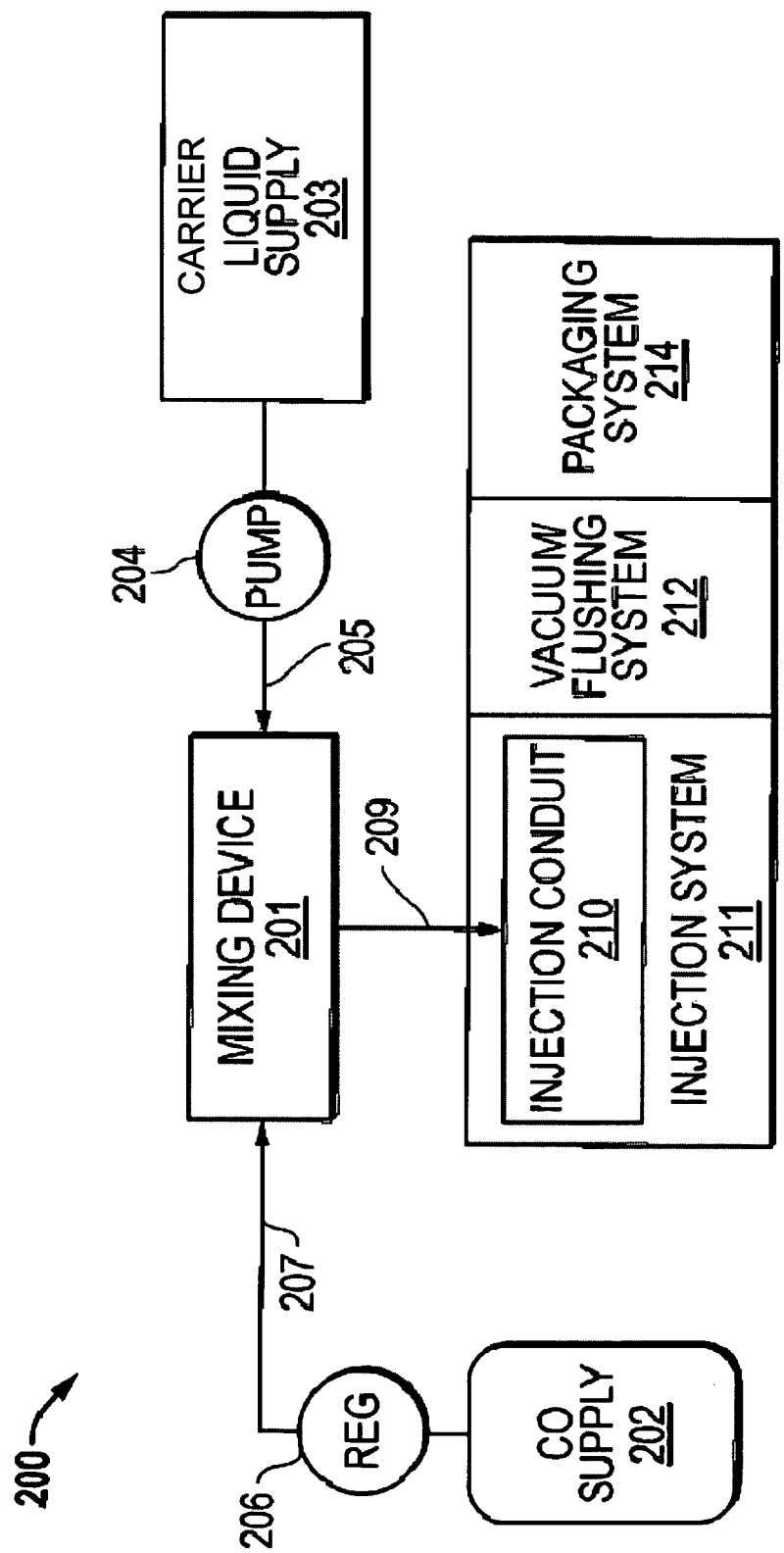
FIG. 2 is a diagrammatic representation of a system for treating meat products with carbon monoxide according to one preferred form of the present invention.

FIG. 2 shows a treatment system 200 that may be used to treat meat products with carbon monoxide according to the present invention. System 200 includes a mixing device 201 that receives carbon monoxide from a carbon monoxide supply 202 and receives a carrier liquid from a carrier liquid supply 203. A suitable carrier liquid may be water, brine, or ammonium hydroxide solution, for example, and may be pumped to mixing device 201 using a suitable pump 204 through suitable connecting line 205. The carbon monoxide is supplied preferably in the form of a gas, and thus a suitable pressure regulator 206 is provided in the connecting line 207 which connects carbon monoxide supply 202 to mixing device 201.

The CO treatment material containing carbon monoxide preferably entirely in solution in the carrier liquid is delivered through suitable connecting lines 209 to one or more injection conduits 210. Injection conduits 210 make up part of an injection system 211 that will be described further below with reference to FIG. 3. In addition to the injection system 211, treatment system 200 shown in FIG. 2 further includes a vacuum and/or flushing system 212 for applying a vacuum to the carbon monoxide treated meat product and/or flushing/rinsing the carbon monoxide treated meat product with a suitable flushing/rinsing fluid. Finally, system 200 includes a packaging system shown diagrammatically at reference numeral 214. Packaging system 214 may comprise any suitable packaging system. For example, packaging system 214 may comprise a tray-type, controlled atmosphere packaging system or a vacuum packaging system. It will be appreciated that there may be a storage facility interposed between injection system 211 and packaging system 214. Any storage of the carbon monoxide treated meat is preferably done under a controlled atmosphere at a suitable storage temperature.

There may be a benefit to allowing a certain minimum amount of time to elapse between the injection treatment according to the invention and the time that the treated meat product is consumed. It is believed that the storage time allows the added materials to better distribute and equilibrate through the meat product. For example, a meat product may preferably be stored a minimum of 24 hours after treatment before it is cooked and consumed. Storage of four to six days or more may also be beneficial. The storage may be in a package or in a storage facility under any suitable storage conditions. Also, it will be appreciated that the storage prior to consumption may be at any location, including in distribution channels from the injection treatment facility to the consumer (for example, in transit to retail or wholesale distributors or at retail or wholesale storage facilities or product displays).

An injection conduit 210 used to inject carbon monoxide and other materials into the volume of a meat product according to the present invention may include any suitable conduit or needle suitable for penetrating the surface of the meat product so that the desired CO treatment material and any other treatment material may be injected into the volume of the meat product. Preferred forms of the invention utilize elongated injection conduits with a sharp distal end for piercing the surface of the meat product and preferably a number of injection passages spaced apart along the length of the injection conduit that penetrates into the interior of the meat product. Rather than discrete injection openings, one or more areas of porous and permeable material such as a plastic, ceramic, or cintered metal may be included along the length of the injection conduit 210 to provide one or more areas through which the treatment material may flow from the conduit into the volume of the meat product being treated. Some forms of the invention may include injection conduits that include porous and permeable material along their entire length with an axial passage extending there through and with a solid distal portion to provide a sharp tip. Still other forms of the invention may include injection conduits of different lengths and with injection flow passages positioned at different penetration depths in the volume of the meat product. These and any other suitable arrangement of injection conduits may be used to distribute the CO treatment material and other liquids or fluids into the volume of the meat product to ensure the desired carbon monoxide treatment and distribution according to the present invention.

It will be appreciated by those skilled in the art that the diagrammatic representation of FIG. 2 does not show numerous components that may be included in system 200. For example, connecting lines 205, 207, and 209 may include numerous fittings and components such as check valves or filters. Vacuum/flushing system 212 and packaging system 214 may in fact each comprise a complicated system, the details of which are well known in the field of meat or food processing. Details on these types of components are unnecessary for an understanding of the present invention, and thus these details are omitted from FIG. 2 so as not to obscure the invention and unnecessary detail.

Figure 3:
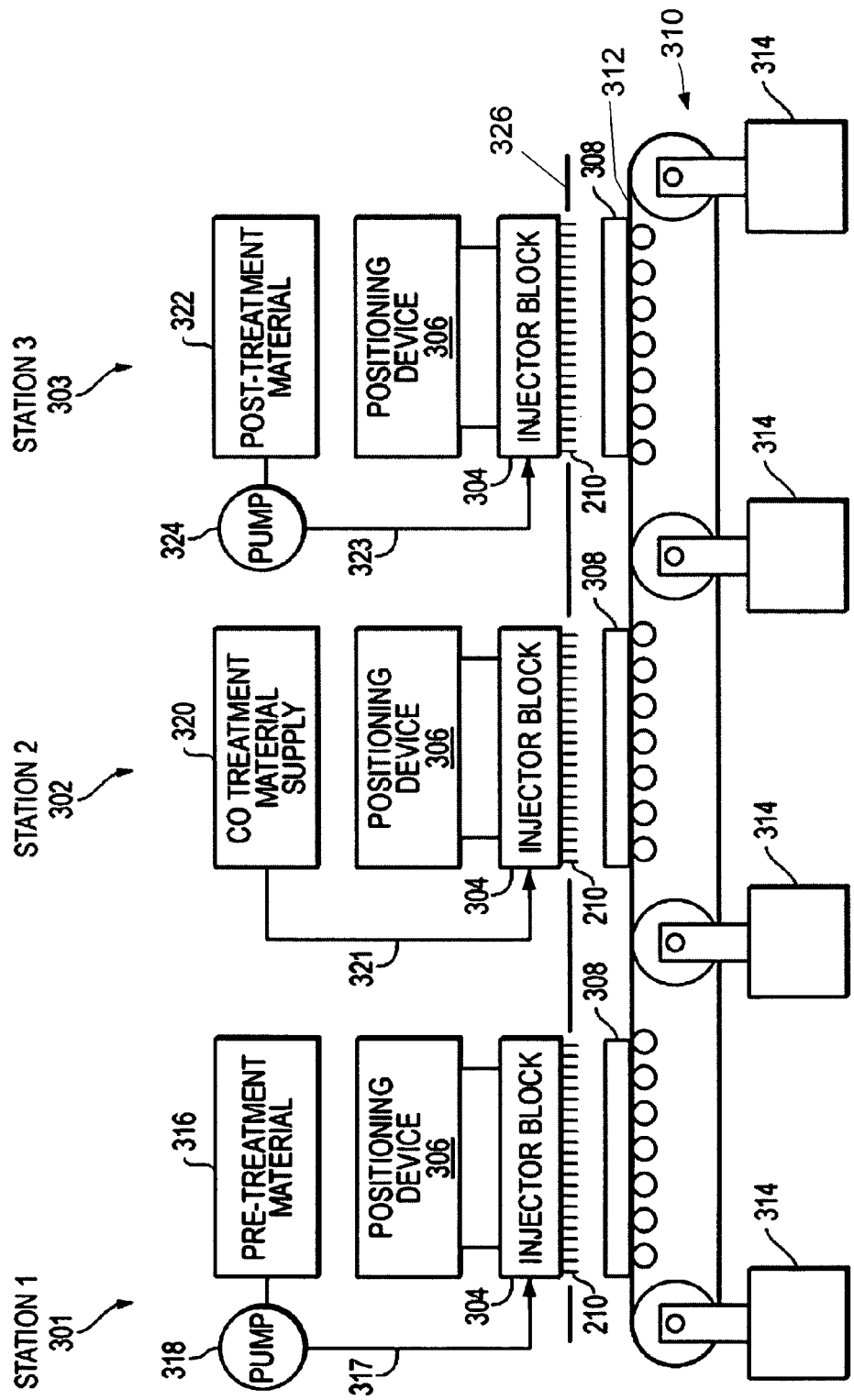
FIG. 3 is a diagrammatic representation of an injection system that may be used in the treatment system shown in FIG. 2.

FIG. 3 provides a diagrammatic illustration of an injection system that may be employed as injection system 211 shown in FIG. 2. Injection system 211 shown in FIG. 3 includes three separate stations for injecting fluids or liquids into a meat product. A first station is shown generally at reference numeral 301, a second station is shown at 302, and a third station is shown at 303. Each station includes an injector block 304 preferably supporting a large number of spaced apart injection conduits 210. Injector block 304 not only serves as a support for the injection conduits 210 but also may serve as a manifold for distributing the desired material from an injector block inlet to the various injection conduits associated with the respective injector block. Each injector block 304 is shown operatively connected with a respective positioning device 306. Each respective positioning device 306 is adapted to move the respective injector block 304, and thus the respective injection conduits 210, relative to a meat product to be treated. In particular, once a meat product such as a product shown at 308 in FIG. 3 is in position for a respective station, the respective positioning device 306 may push the injector block 304 downwardly so that the associated injection conduits 210 penetrate into the volume of the meat product to a desired injection position. From this injection position, the desired treatment material may be injected into the volume of the meat product 308 through the injection conduits 210. Once a desired volume of treatment material has been injected, the respective positioning device 306 may raise its associated injector block 304 to withdraw the respective injection conduits 210 from the meat product 308.

Injection system 211 shown in FIG. 3 includes a meat product support and positioning arrangement shown generally at reference numeral 310. Support and positioning arrangement 310 includes a conveyor 312 for conveying meat products 308 into the system, from station to station in the system, and finally out of the system to a subsequent processing stage such as a vacuum/flushing system or a packaging system as shown in FIG. 2, or a surface treatment arrangement as will be described below with reference to FIG. 6. In addition to or in lieu of the positioning device 306 associated with each station, injection system 211 may include a meat product support positioning arrangement including actuating devices 314 that may be operated to move the meat product support and thus the meat product 308 in relation to the various injector blocks 304 and injection conduits 210.

Each treatment station 301, 302, and 303 shown in FIG. 3 is associated with a separate treatment material supply connected through a suitable conduit to the respective injector block 304. In particular, FIG. 3 shows a pre-treatment material supply 316 connected to the injector block 304 associated with station 301, through connecting conduit 317. A pump 318 is shown in the conduit 317 for supplying the pre-treatment material at a suitable injection pressure. A CO treatment material supply 320 is shown associated with the second station 302 and connected through a suitable conduit 321 to supply the CO treatment material to the respective injector block 304 at a suitable injection pressure. This CO treatment material supply 320 may, for example, correspond to the arrangement of mixing device 201, and material supplies 202 and 203 shown in FIG. 2. Finally, a post-treatment material supply 322 is shown associated with the third station 303 together with connecting conduit 323 and pump 324 to provide the material under a suitable injection pressure.

The injection pressures suitable for use in injecting CO treatment material, pre-treatment, and post-treatment material according to the present invention generally coincide with those pressures used for injecting brines into meat products as known in the prior art. The injection pressure may vary depending upon the temperature and nature of the meat being treated, the size of injection conduits employed, the exit openings in the injection conduits, and the amount of material to be added to the meat product. For beef steaks at 35 degrees Fahrenheit, for example, 2.5 bars is a suitable pressure for injecting material to produce a content of added solution at 10% by weight with the meat, and 3.5 bars is a suitable pressure for injecting material to produce a content of added solution at 20% by weight with the meat. Lower injection pressures are also possible within the scope of the invention, depending upon the nature of the injection device.

It will be appreciated that the meat product 308 being treated in injection system 211 shown FIG. 3 may need to be refrigerated in the injection system to maintain suitable temperature conditions in the meat product. FIG. 3 shows an insulating barrier 326 above the meat product supporting arrangement 310 and below the injector blocks 304. Injection conduits 211 traverse the plane of the insulating barrier 326 through suitable openings to reach the meat products 308. The insulating barrier material may simply terminate in the area of each injector block 304 or may include openings through which the individual injection conduits may extend to reach the meat products 308 to be treated. Injection system 211 may also have associated with it a suitable refrigeration arrangement for cooling at least the area between the barrier 326 and the meat product support surface.

The present invention encompasses numerous variations on the injection system shown in FIG. 3. For example, a suitable injection system may include only a single injection station rather than the three separate stations shown in FIG. 3. Even in a single station embodiment, different material supplies may be connected to a single injector block (such as injector block 304 in FIG. 3) so that different materials including the CO treatment material and any pre-treatment or post-treatment materials may be injected into the meat products through the single injector block and associated injection conduits. Furthermore, it is possible according to the present invention to use only a limited number of injection conduits 210 or even only a single injection conduit. When using a limited number of injection conduits 210 or a single injection conduit for a relatively large meat product, each injection conduit is preferably inserted at one point to inject the desired material and then withdrawn and inserted at another point for injecting the treatment material at that point. This process may be repeated at different locations across the meat product to provide the desired even carbon monoxide distribution throughout the volume of the meat product.

In preferred forms of the invention, the different injection points for the CO treatment material and for the pre-treatment and post-treatment materials are spaced apart on approximately one-eighth (⅛) of an inch to one (1) inch centers across the meat product being treated. Generally, the closer the spacing the better, subject to physical limitations of the injection conduits and the impact of the injection conduits on the meat. Where injection conduits are inserted at different points to provide the desired injection coverage, the different insertion points are also spaced apart between one-eighth (⅛) of an inch to one (1) inch. Any suitable needle or injection conduit may be used in the present invention. The outer diameter of preferred needles or injection conduits may range from 2 to 6 millimeters or more. It will be appreciated that the spacing of injection conduits, the size of the conduits, and suitable injection pressures may vary with the nature of the meat product being treated.

Figure 4:
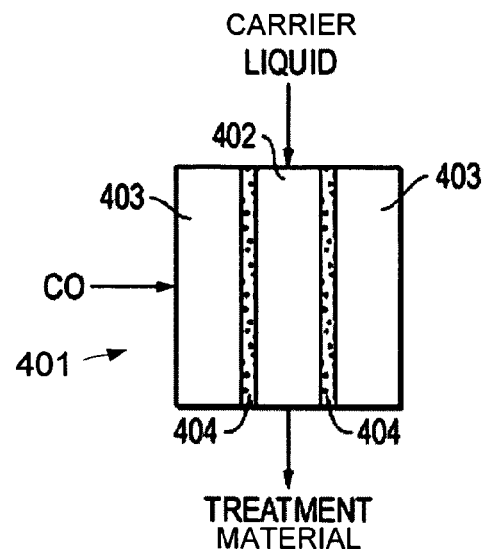
FIG. 4 is a diagrammatic representation of a preferred device for mixing carbon monoxide and a carrier liquid to produce a CO treatment material.
Figure 5:
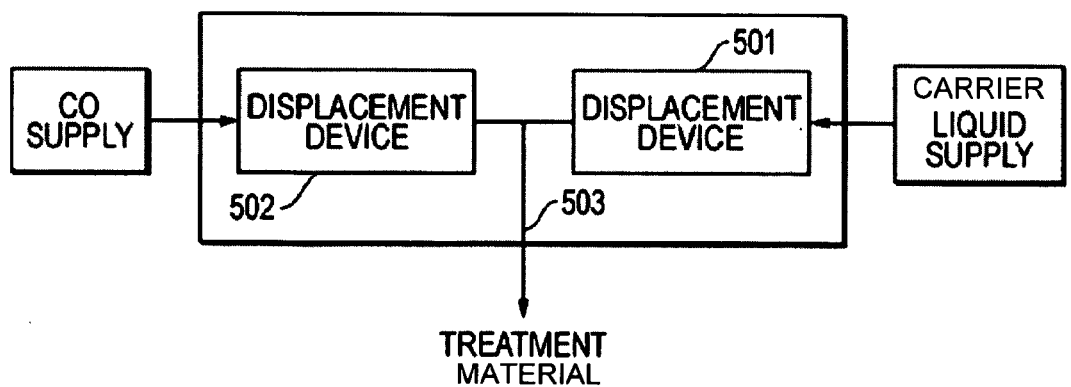
FIG. 5 is a diagrammatic representation of an alternate arrangement for mixing carbon monoxide and a carrier liquid to produce a desired CO treatment material.

FIGS. 4 and 5 show alternate mixing devices (see 201 in FIG. 2) that may be used to produce a treatment material of carbon monoxide and a suitable carrier liquid. Referring first to FIG. 4, a sparging device 401 may be connected to a carrier liquid supply and to a supply of carbon monoxide gas. The carrier liquid may be directed through a contact passage 402 associated with the sparging device 401 while the carbon monoxide gas may be directed into the sparging device into a chamber 403. Chamber 403 is separated from contact passage 402 by a suitable permeable barrier 404 including contact openings (not shown) through which the carbon monoxide may pass into the carrier liquid passing through passage 402. The contact openings (not shown) may comprise perforations or may be associated with a porous and permeable material such as a cintered metal or ceramic material from which the permeable barrier is formed. Permeable barrier 404 may alternatively comprise a selectively permeable membrane that allows carbon monoxide gas to into the carrier liquid passing through passage 402. The carbon monoxide gas pressure and injection liquid flow rate may be controlled through the sparging device 401 so that a desired amount of carbon monoxide is introduced into the carrier liquid to produce the CO treatment material having the desired carbon monoxide content.

An alternate mixing device shown in FIG. 5 includes two positive displacement devices 501 and 502 such as piston and cylinder arrangements. Displacement device 501 receives carrier liquid from the carrier liquid supply while displacement device 502 receives carbon monoxide gas from the carbon monoxide supply. Controlled volumes of carbon monoxide gas and carrier liquid may be displaced into a common exit conduit 503 to produce the CO treatment material having the desired carbon monoxide content.

Figure 6:
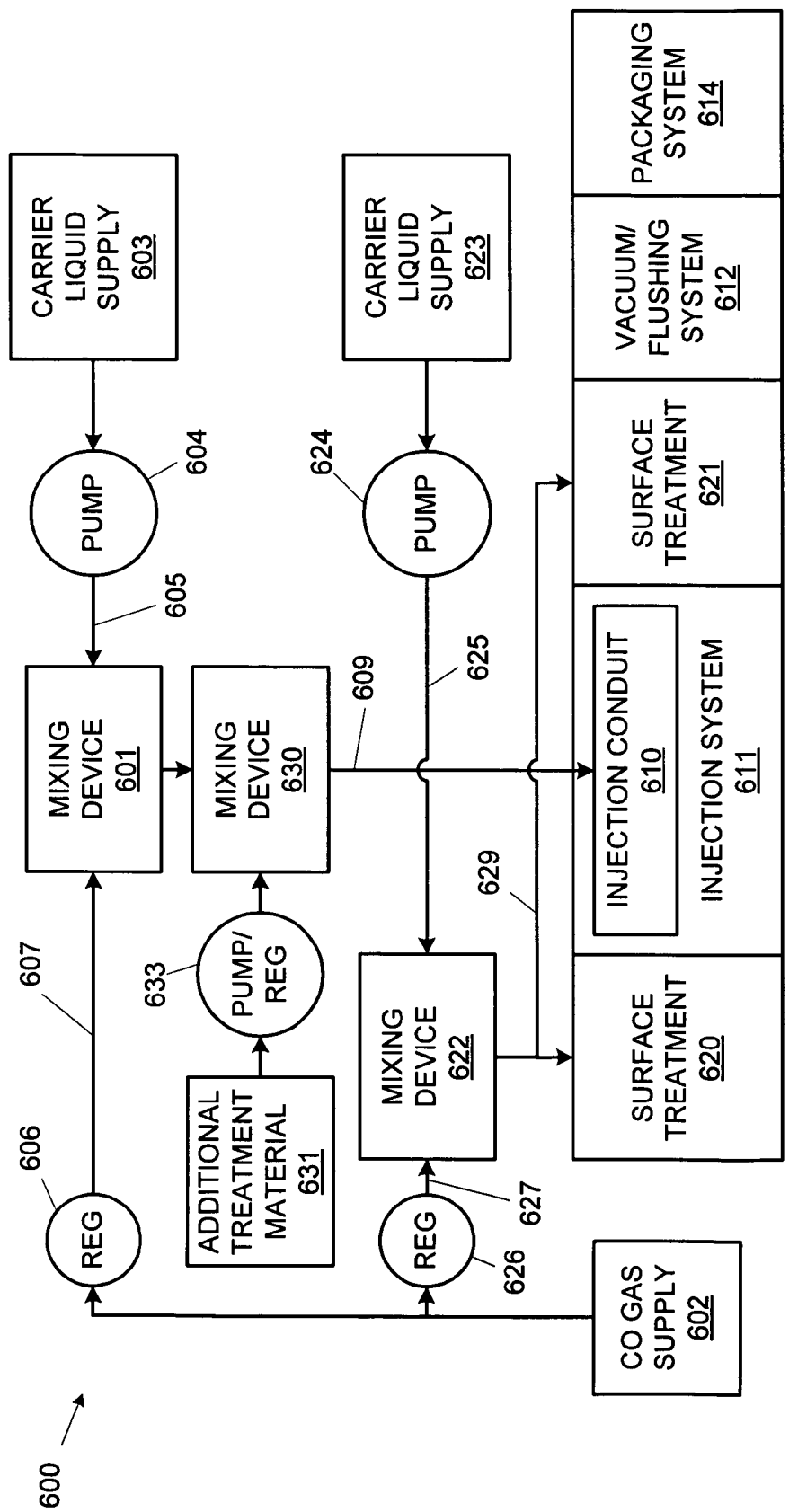
FIG. 6 is a diagrammatic representation of an alternate system for treating meat products with carbon monoxide according to the present invention.

FIG. 6 shows an alternate carbon monoxide treatment system 600 according to the invention similar to system 200 shown in FIG. 2. Unlike the system shown in FIG. 2, however, alternate carbon monoxide treatment system 600 includes two surface treatment systems 620 and 621 for applying a treatment material to the surface of a meat product.

System 600 includes a mixing device 601 which corresponds to the mixing device 201 shown in FIG. 2. Mixing device 601 receives carbon monoxide gas from a carbon monoxide gas supply 602 and receives a carrier liquid from a carrier liquid supply 603. A suitable pump 604 directs the carrier liquid from carrier liquid supply 603 to mixing device 601 through connecting line 605. Carbon monoxide gas from gas supply 602 is regulated through pressure/flow regulator 606 and then directed to mixing device 601 through carbon monoxide gas line 607. The material exiting mixing device 601 ultimately is directed through line 609 to one or more injection conduits 610 associated with an injection system 611. This injection system 611 corresponds to the injection system 211 shown in FIG. 2, and may comprise the specific injection system shown in FIG. 3, or some other suitable arrangement for injecting materials into a meat product. Carbon monoxide treatment system 600 also includes a vacuum/flushing system 612 which corresponds to the similarly named system shown at 212 in FIG. 2, and also includes a packaging system 614 which corresponds to the packaging system 214 shown in FIG. 2. The process direction in system 600 is from left to right in FIG. 6 similar to the process direction for the system shown in FIG. 2.

In the example treatment system 600 shown in FIG. 6, surface treatment system 620 is placed before injection system 611 in the process direction, and surface treatment system 621 is placed after the injection system in the process direction. A second mixing device 622 is dedicated for mixing carbon monoxide gas from gas supply 602 with a carrier liquid supplied from a separate carrier liquid supply 623. A pump 624 directs carrier liquid from supply 623 through supply line 625 to mixing device 622. Carbon monoxide gas from supply 602 is regulated through a separate pressure/flow regulator 626 and then supplied through line 627 to mixing device 622. The surface treatment material exiting mixing device 622 is directed through conduits 629 to the two surface treatment systems 620 and 621.

The particular carbon monoxide treatment system 600 shown in FIG. 6 also includes a separate arrangement for adding an additional treatment component to the carbon monoxide and carrier liquid combination exiting mixing device 601. In particular, a third mixing device 630 receives the carbon monoxide and carrier liquid combination exiting mixing device 601 and combines or otherwise mixes in an additional treatment component which is directed from a supply 631 through a suitable pump or pressure/flow regulator 633. Numerous different types of additional treatment components may be added through the combination of devices 630, 631, and 633. In one preferred form of the system 600, the additional material supply 631 includes a supply of a pH modifying material. For example, the additional treatment component supply 631 may comprise an ammonia gas supply or a carbon dioxide gas supply. Alternatively, the pH modifying material may be in the form of a liquid which is pumped into mixing device 630. For example, the additional treatment component from supply 631 may include an ammonium hydroxide solution or a carbonic acid solution. In yet another forms of the invention, the additional treatment material may include phosphates, salts, or any other suitable material for injection into a meat product.

The carbon monoxide treatment system 600 shown in FIG. 6 represents one preferred arrangement which facilitates using two different types of CO treatment materials to treat a meat product. A surface treatment material (that is, surface CO treatment material) is applied through the surface treatment systems 620 and 621, and an interior treatment material (interior CO treatment material) is ultimately injected into the meat product through injection system 611. The arrangement of devices shown in FIG. 6 also represents the preferred arrangement in which carbon monoxide gas is added to the carrier liquid first before additional treatment components are added. It is believed that this mixing of carbon monoxide into the carrier liquid first helps maintain the carbon monoxide in solution in the carrier liquid, which is believed desirable to help ensure that the carbon monoxide does not produce an unnatural and undesirably persistent red color in the meat product. In this preferred arrangement, the carrier liquid from supplies 603 and 623 comprises substantially pure water such as water from a reverse osmosis system, some other filtering or purifying system, or perhaps tap water. Of course, where the same carrier liquid is used for both the surface treatment material and interior treatment material, the carrier liquid supplies may be combined. However, the multiple carrier liquid supplies 602 and 623 shown in FIG. 6 allow the system to use two different types of carrier liquids for mixing with carbon monoxide in the two separate mixing devices 601 and 622.

Numerous variations on treatment system 600 are possible within the scope of the present invention. For example, although two separate surface treatment systems 620 and 621 are shown in FIG. 6, other forms of system 600 may include only a single surface treatment system. This single surface treatment system may be placed ahead of injection system 611 in the process direction or following the injection system in the process direction. Yet other forms of the invention may eliminate an injection system altogether, and include only one or more surface treatment systems. A carbon monoxide treatment system may be limited to a surface treatment arrangement especially for relatively thin cuts of meat on the order of 1 to ½ inch thick or less. It is also possible to use an injection system including one or more injection conduits to apply a CO treatment material to a surface of a meat product within the scope of the present invention. Such a surface application may be accomplished by forcing CO treatment material through the injection conduits prior to inserting the conduits into the interior of the meat product. The CO treatment material in this case sprays or otherwise falls onto the meat product positioned below the injection conduits.

Another preferred treatment system according to the invention utilizes a different arrangement for producing the CO treatment materials. This alternate preferred arrangement applies the carbon monoxide to the carrier liquid in a gas combination, such as a mixture of carbon monoxide and carbon dioxide for example. In this alternate arrangement the two gasses carbon monoxide and carbon dioxide are first mixed in the desired proportion and then directed to the mixing device (601 and/or 622) for mixing with the carrier liquid. Where an additional treatment component is employed, such as a pH increasing material, ammonia gas for example, that material may be added to the resulting mixture of carbon monoxide, carbon dioxide, and carrier liquid.

Figure 7:
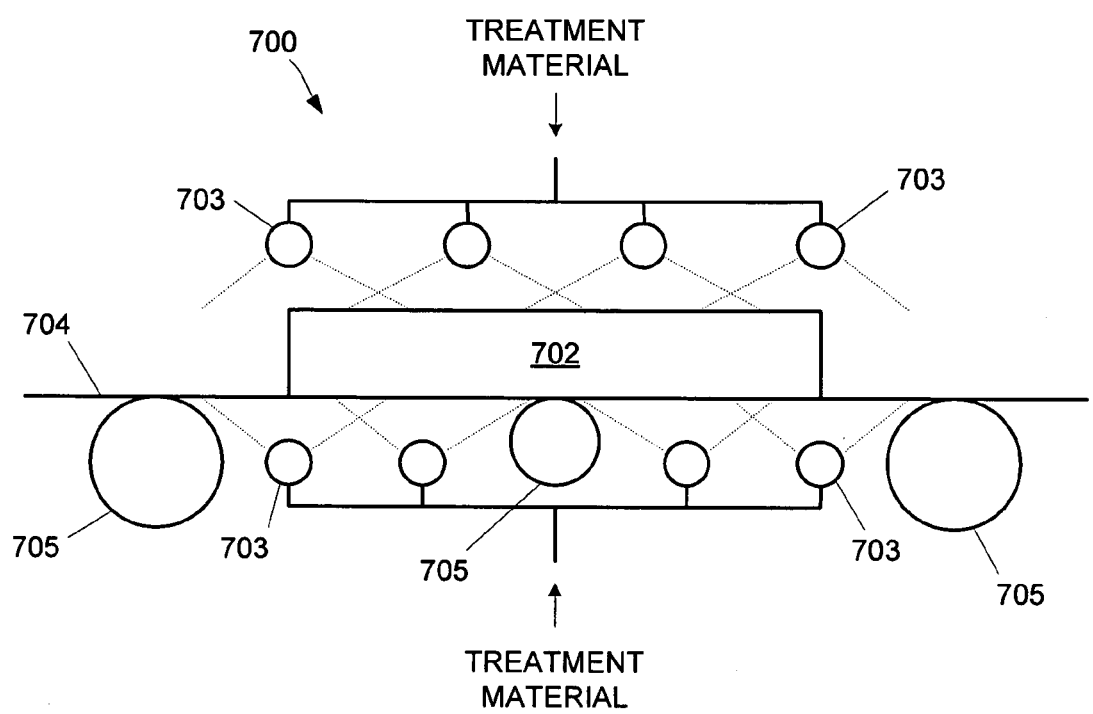
FIG. 7 is a diagrammatic representation of a surface treatment arrangement that may be used in treating the surface of a meat product with a CO treatment material.

FIG. 7 illustrates one preferred surface treatment system 700 that may be used for the surface treatment systems shown at 620 and 621 in FIG. 6. Surface treatment 700 applies the CO treatment material to the surface of the meat product 702 by spraying the CO treatment material onto the meat product through a number of spray nozzles 703. Meat product 702 is supported on a suitable support structure such as a conveyor belt 704, which is carried by conveyor belt rollers 705. It will be appreciated that conveyor belt 704 is preferably an open link type belt that exposes the bottom surface of meat product 702 to the spray of treatment material from the bottom spray nozzles 703. However, it may be possible to eliminate the lower nozzles 703 in some instances, that is, the nozzles spraying the bottom surface of meat product 702.

The example surface treatment system 700 shown in FIG. 7 may be operated in a number of different ways within the scope of the present invention. In one arrangement, conveyor belt 704 is caused to stop with the meat product 702 in the position shown in FIG. 7, and then spray nozzles 703 may be activated to spray the CO treatment material onto the meat product. The spray from nozzles 703 may then be momentarily stopped while conveyor belt 704 is operated to place another meat product in the position shown in FIG. 7. Alternatively to this intermittent spray, spray nozzles 703 may be operated continuously as meat products are conveyed through the position shown in FIG. 7. In yet other surface treatment arrangements, a single elongated and transversely mounted spray nozzle or other emitter may be positioned above the meat products along the conveyor belt path and a single spray nozzle or other emitter may be positioned below the conveyer belt path. Complete surface coverage is produced in this arrangement by running the spray nozzles/emitters continuously as meat products pass between them on the conveyer belt 704. Another "emitter" may, for example, include a device that produces a flowing sheet or curtain of treatment material that falls on the meat product as it is carried along the process path by a suitable structure. Alternate surface treatment systems within the scope of the invention may not use spray nozzles or other emitting devices at all but rather cause the meat products to be submerged momentarily in the treatment material and then removed for further processing/packaging. This may be accomplished by causing a conveyor belt flight to travel through a vat in which treatment material is maintained. Yet other forms of the invention may suspend a meat product on a hook or other supporting device in position to be sprayed with a treatment material according to the invention or immersed in a treatment material according to the invention.

The carbon monoxide treatments described thus far in this description of preferred embodiments have been treatments that apply a CO treatment material to the meat product, either by injection into the interior of the meat product or by surface application. Other forms of the present carbon monoxide treatment invention may apply carbon monoxide indirectly to the meat product. For example, a meat product may be placed in contact with a suitable liquid such as water. Carbon monoxide gas may then be applied to the water. The carbon monoxide in this case will go into solution in the water and reach the meat product in that resulting solution. It is also possible that carbon monoxide gas bubbles may traverse the water in contact with the meat product and then make contact with the meat product.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the following claims.

The invention claimed is:

1. A method for treating an uncooked cut of meat, the method including:
   (a) providing a treatment material containing carbon monoxide and a carrier liquid, the carbon monoxide content in the treatment material being at or below the solubility level of carbon monoxide in the carrier liquid at the temperature of the carrier liquid with substantially all of the carbon monoxide being held in solution in the carrier liquid; and
   (b) applying the treatment material to a surface of the uncooked cut of meat while substantially all of the carbon monoxide in the treatment material applied to the uncooked cut of meat is held in solution in the carrier liquid of the applied treatment material.

2. The method of claim 1 wherein the step of applying of the treatment material includes spraying the treatment material onto the surface of the uncooked cut of meat.

3. The method of claim 1 wherein the step of applying the treatment material includes submerging the surface of the uncooked cut of meat in the treatment material.

4. The method of claim 1 wherein the step of applying the treatment material includes pouring the treatment material onto the surface of the uncooked cut of meat.

5. The method of claim 1 further including injecting the treatment material into an interior volume of the uncooked cut of meat.

6. The method of claim 1 wherein the treatment material applied to the uncooked cut of meat includes a carbon monoxide content to produce less than one hundred percent carbon monoxide saturation in the uncooked cut of meat.

7. A method for treating an uncooked cut of meat, the method including:
   (a) providing a treatment material containing carbon monoxide in a carrier liquid, the carbon monoxide content being at or below the solubility level of carbon monoxide in the carrier liquid such that substantially all of the carbon monoxide is held in solution in the carrier liquid; and
   (b) applying the treatment material to a surface of the uncooked cut of meat while substantially all of the carbon monoxide in the applied treatment material is held in solution in the carrier liquid of the applied treatment material.

8. The method of claim 7 wherein the carrier liquid is pH modified water.

9. The method of claim 8 wherein the pH modified water includes an ammonium hydroxide solution.

10. The method of claim 8 wherein the pH modified water includes a carbonic acid solution.

11. The method of claim 8 wherein producing the treatment material includes placing water in contact with carbon monoxide gas and then placing the resulting water in contact with a pH modifying material.

12. The method of claim 11 wherein the pH modifying material includes ammonia gas.

13. The method of claim 11 wherein the pH modifying material includes carbon dioxide gas.

14. The method of claim 8 wherein producing the treatment material includes placing water in contact with a mixture of carbon monoxide gas and a pH modifying gas.

15. A method for treating an uncooked cut of meat, the method including:
   (a) injecting an interior treatment material into an interior volume of the uncooked cut of meat, the interior treatment material including a first carbon monoxide concentration;
   (b) applying a surface treatment material to a surface of the uncooked cut of meat, the surface treatment material including a second carbon monoxide concentration greater than the first carbon monoxide concentration; and
   (c) wherein the carbon monoxide content in the interior treatment material is at or below the solubility level of carbon monoxide in a carrier liquid of the interior treatment material such that substantially all of the carbon monoxide in the interior treatment material is held in solution in the interior treatment material, and wherein the carbon monoxide content in the surface treatment material is at or below the solubility level of carbon monoxide in a carrier liquid of the surface treatment material such that substantially all of the carbon monoxide in the surface treatment material is held in solution in the surface treatment material.

16. The method of claim 15 wherein the interior treatment material includes an ammonium hydroxide solution.

17. The method of claim 15 wherein the interior treatment material includes a carbonic acid solution.

18. The method of claim 15 wherein the surface treatment material includes a pH modified water.

19. A method including:
(a) applying a carrier liquid to the surface of an uncooked cut of meat, the carrier liquid containing carbon monoxide; and
(b) placing carbon monoxide in contact with the uncooked cut of meat through the carrier liquid at the surface of the meat product, the carbon monoxide content in the carrier liquid being at or below the solubility level in the carrier liquid such that substantially all of the carbon monoxide placed in contact with the uncooked cut of meat is held in solution in the carrier liquid.

20. The method of claim 19 wherein the carbon monoxide is added to the carrier liquid prior to applying the carrier liquid to the surface of the uncooked cut of meat.

21. The method of claim 19 wherein carbon monoxide in gaseous form is applied to the carrier liquid after the carrier liquid is in contact with the uncooked cut of meat.

* * * * *